United States Patent
Vonach

(10) Patent No.: US 9,554,427 B2
(45) Date of Patent: Jan. 24, 2017

(54) RADIO TRANSMISSION BETWEEN MODULES IN A POTENTIAL-SEPARATED LED CONVERTER

(71) Applicant: TRIDONIC GMBH & CO KG, Dornbirn (AT)

(72) Inventor: Christoph Vonach, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 14/651,915

(22) PCT Filed: Dec. 19, 2013

(86) PCT No.: PCT/AT2013/000206
§ 371 (c)(1),
(2) Date: Jun. 12, 2015

(87) PCT Pub. No.: WO2014/094012
PCT Pub. Date: Jun. 26, 2014

(65) Prior Publication Data
US 2015/0312979 A1  Oct. 29, 2015

(30) Foreign Application Priority Data
Dec. 21, 2012  (DE) .......... 10 2012 224 164

(51) Int. Cl.
*H05B 33/08* (2006.01)
*H05B 37/02* (2006.01)
*H02M 1/42* (2007.01)

(52) U.S. Cl.
CPC .......... *H05B 33/0809* (2013.01); *H02M 1/42* (2013.01); *H05B 33/0842* (2013.01); *H05B 37/02* (2013.01); *H05B 37/0272* (2013.01)

(58) Field of Classification Search
CPC .......... H05B 37/0272; H05B 33/0815; H05B 33/0842; H05B 33/0863; H05B 37/02; H05B 37/0254; F21V 15/01; F21V 19/001; F21V 23/02; H04B 1/005; H04B 1/034; H04B 1/0458; H04B 1/086; H04B 1/44; H04B 1/7163; H04B 7/2625; A61B 1/00016; A61B 1/00029; A61B 1/0684
See application file for complete search history.

(56) References Cited

U.S. PATENT DOCUMENTS

2002/0024451 A1* 2/2002 Rosenberg ............. G07B 15/02
340/932.2
2007/0182727 A1* 8/2007 Kobayashi ........... G09G 3/3611
345/204

(Continued)

FOREIGN PATENT DOCUMENTS

DE  202007012248 U1  10/2007
DE  102007049052 A1  4/2009
DE  102010031230 A1  9/2011

*Primary Examiner* — Vibol Tan
(74) *Attorney, Agent, or Firm* — Volpe and Koenig, P.C.

(57) ABSTRACT

The invention relates to an operating unit (1) for lamps, in which a galvanic isolator (4) between a primary side, which comprises at least one circuit (2), and a secondary side, which comprises at least one circuit (3), is bridged by a radio channel (5). The lamps are supplied on the secondary side with respect to the galvanic isolator and the primary side is designed for connection to a voltage supply, in particular a mains voltage. The primary-side circuit (2) and the secondary side circuit (3) have a respective radio interface (2A, 3A) for establishing the unidirectional or bidirectional radio channel (5). The radio channel (5) lies preferably within a preferably metal housing (6) of the operating unit (1). Communication from the primary side to the secondary side and vice versa can be effected via radio through the radio channel (5).

17 Claims, 2 Drawing Sheets

(56) References Cited

U.S. PATENT DOCUMENTS

| | | | |
|---|---|---|---|
| 2012/0007519 A1 | 1/2012 | Urano | |
| 2012/0274208 A1* | 11/2012 | Chen | H01Q 1/44 315/34 |
| 2012/0286770 A1* | 11/2012 | Schroder | H05B 37/0272 324/113 |
| 2013/0193849 A1* | 8/2013 | Zimmermann | H05B 33/0815 315/112 |
| 2014/0139347 A1* | 5/2014 | Forster | G06K 7/10128 340/686.6 |
| 2016/0165702 A1* | 6/2016 | Lai | H05B 33/0845 315/201 |

\* cited by examiner

RADIO TRANSMISSION BETWEEN MODULES IN A POTENTIAL-SEPARATED LED CONVERTER

FIELD OF THE INVENTION

The present invention relates to an operating device for illumination means, in particular for an LED string, which operating device has DC isolation ("SELV barrier") between a primary-side circuit and a secondary-side circuit of the operating device. The invention also relates to a communication method for operating devices for illumination means, in particular LED converters.

BACKGROUND

Operating devices for illumination means, in particular LED converters, are known from the prior art and have an IC on a primary side and at least one IC on a secondary side, said ICs being DC-isolated from one another by an SELV barrier. The illumination means is electrically supplied on the secondary side, while the primary side can be supplied from a voltage supply, in particular a grid voltage.

It is often desirable that the primary-side and secondary-side circuits can communicate with one another. For this purpose, it is already known from the prior art that communication of this type across the SELV barrier is done by means of an optocoupler. Furthermore, it is known to communicate across DC isolation by means of a transformer.

However, the communication across the SELV barrier by means of an optocoupler or transformer, which is known from the prior art, places high demands on the components which bridge the SELV barrier, which in turn leads to high costs in manufacturing the operating devices.

SUMMARY

The problem addressed by the present invention is to improve the known prior art. In particular, the problem addressed by the present invention is to enable communication to the secondary side of DC isolation in an operating device for illumination means, wherein cost-intensive components such as optocouplers are to be dispensed with. Optionally, bidirectional communication between the primary side and the secondary side of DC isolation in an operating device for illumination means is also enabled.

The problem addressed by the invention is solved by an operating device for illumination means according to the features of the independent claims. The dependent claims advantageously further develop the key concepts of the invention.

Specifically, the present invention relates to an operating device for illumination means, in particular a converter for an LED string, which operating device comprises a primary-side circuit and a secondary-side circuit, which are isolated from one another by DC isolation, wherein the illumination means can be supplied on the secondary side with reference to the DC isolation and the primary side is set up for connection to a voltage supply, in particular a grid voltage, wherein the primary-side circuit and the secondary-side circuit each have a radio interface for setting up a unidirectional or bidirectional radio channel which connects the primary-side circuit and the secondary-side circuit to one another, wherein the radio channel is preferably within a housing, preferably a metal housing, of the operating device.

The radio channel makes it possible to transmit data or information between the primary side and the secondary side of the operating device in a unidirectional or bidirectional manner. That is to say that the primary-side circuit can communicate and exchange data with the secondary-side circuit. The primary-side and/or secondary-side circuit are/is preferably a smart circuit such as an ASIC, a microcontroller (μC) or integrated circuit (IC). By means of the radio channel, an optocoupler or transformer for communicating across the DC isolation is superfluous. Since components which are necessary for implementing a radio connection are smaller than optocouplers or transformers, the operating device can also be constructed to be more compact.

Preferably, the radio channel is configured for bidirectional communication between the primary-side circuit and the secondary-side circuit.

Preferably, the radio channel is made up of a first antenna, which is connected to the primary-side circuit, and a second antenna, which is connected to the secondary-side smart circuit.

Antennas for radio communication are small and inexpensive and therefore aid in reducing the costs and the dimensions of the operating device.

Preferably, the radio channel is made up of a first antenna, which is formed on a circuit board of the primary-side circuit, and a second antenna, which is formed on a circuit board of the secondary-side circuit.

By forming the necessary antennas on the circuit board of the circuits or on printed circuit boards (PCBs) of the circuits, a particularly cost-effective and space-saving solution is achieved.

Preferably, both the radio channel and the two circuits are housed in the housing in which the operating device is housed.

Preferably, the housing in which the operating device is housed is made of metal.

An advantage of the housing of the present invention is that the radio communication via the radio channel is a purely internal communication of the operating device. Since the housing is preferably made of metal, no external interference can therefore be caused.

Preferably, the radio power of the radio channel is in the range from 1 to 100 mW, preferably in the range from 1 to 10 mW.

The operating device of the present invention gets by with a very low radio power and can thus be constructed to be very small since no powerful antennas are required; in addition, the energy consumption of the operating device can be reduced.

Preferably, the radio channel bridges a path of approximately 0.5 to 5 cm, preferably approximately 1 cm, between the primary-side circuit and the secondary-side circuit.

The distance of approximately 1 cm to be overcome by the radio path is substantially the path which is required as spatial distance for DC isolation for reasons of safety.

Preferably, the DC isolation is created by means of a transformer.

Preferably, the operating device is controllable via the radio channel.

The radio channel is therefore used both as internal and as external communication connection. Separate control means no longer need to be added to the operating device. The operating device can therefore be constructed to be smaller.

Preferably, the radio channel is configured for bidirectional external communication.

Therefore, information and data, for example operating parameters, can also be communicated externally via the radio channel, as a result of which maintenance and configuration via a wireless connection is simplified for operating devices of the present invention.

Preferably, at least one antenna is configured for bidirectional external communication.

Preferably, at least one antenna is configured as a DALI interface.

Preferably, the radio channel is configured as a DALI interface.

Thus, a wide variety of commands or errors can be transmitted to the operating device via a wireless DALI bus.

Preferably, the primary-side circuit and/or the secondary-side circuit are/is an ASIC.

An ASIC is an example of a smart circuit, which may also be a microcontroller or integrated circuit, however.

Preferably, the primary-side circuit and/or the secondary-side circuit control(s) a clocked component and/or a component with a power-controlling element.

Preferably, the operating device is an LED converter.

In particular, an LED converter usually has an SELV barrier in order to create isolation between output and the input.

The present invention also relates to an LED luminaire having an LED string which is supplied from the secondary side of an operating device according to the above description.

The present invention also relates to a method for operating illumination means, in particular an LED string, wherein the method comprises providing an electric supply for the illumination means by means of a primary-side circuit and a secondary-side circuit, which are isolated from one another by means of DC isolation, wherein the illumination means can be supplied on the secondary side with reference to the DC isolation and the primary side is set up for connection to a voltage supply, in particular a grid voltage, wherein the primary-side circuit and the secondary-side circuit communicate with one another via a unidirectional or bidirectional radio channel.

The present invention also relates to a smart circuit, in particular an IC, ASIC and/or microcontroller or a hybrid version thereof, which is configured for use in an LED converter and has correspondingly configured input and output connections, and which has a radio interface for communication with another component of the LED converter.

BRIEF DESCRIPTION OF THE DRAWINGS

The present invention is now described in more detail with reference to the appended figures.

In this case.

DETAILED DESCRIPTION OF THE PREFERRED EMBODIMENTS

Figure 1:
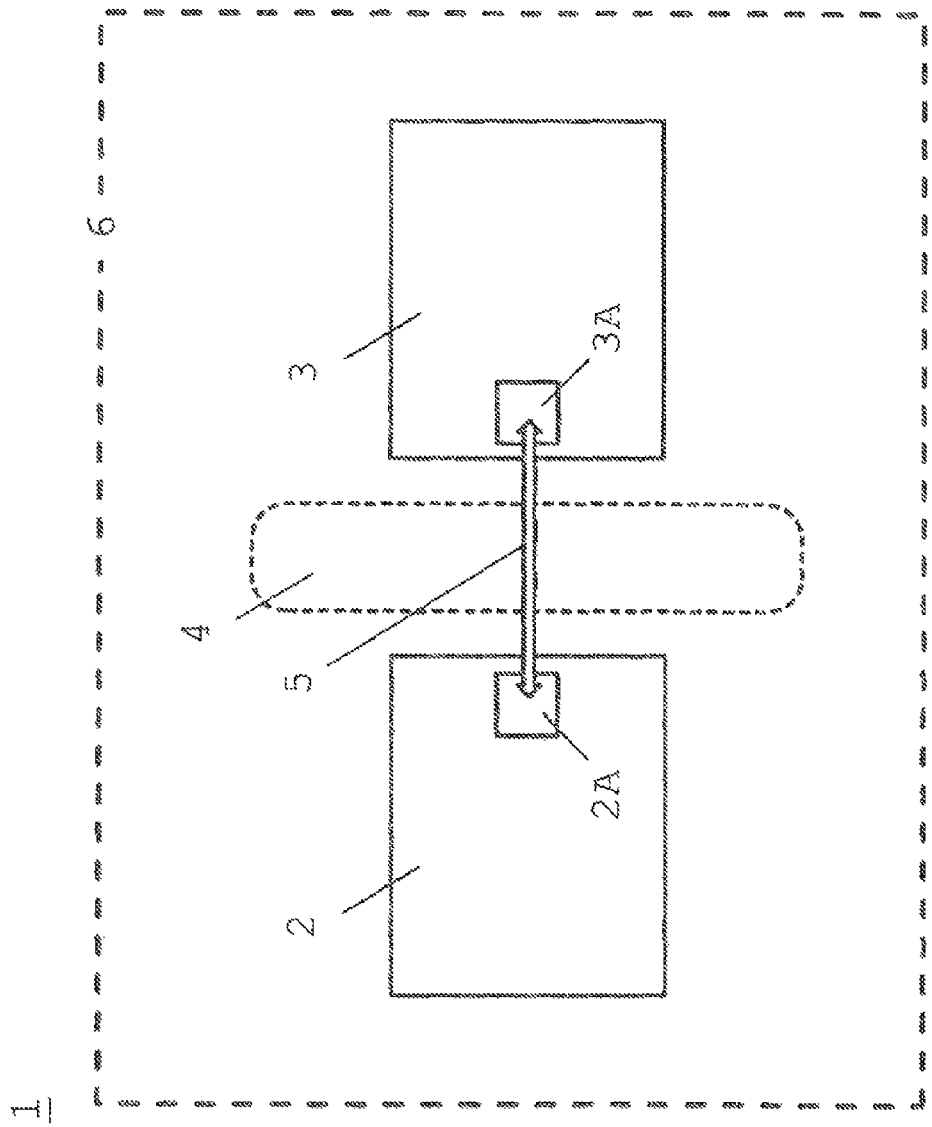
FIG. 1 is a schematic illustration of an operating device of the present invention.

FIG. 1 shows an operating device 1 which is completely housed in a housing 6. However, the operating device 1 may also consist of a plurality of components with in each case individual housings. The housing 6 is preferably made of metal or another material which can shield radio communication against interference.

The operating device 1 consists of at least one circuit 2 on a primary side and at least one circuit 3 on a secondary side with respect to DC isolation 4. The at least two circuits 2, 3 are preferably smart circuits, for example an integrated circuit such as an ASIC or a microcontroller, for example. In this case, the circuits 2 on the primary side can be identical to or different from the circuits 3 on the secondary side. Preferably, the primary-side and the secondary-side smart circuit 2, 3 each control one or more clocked components or components with a power-controlling element.

Figure 2:
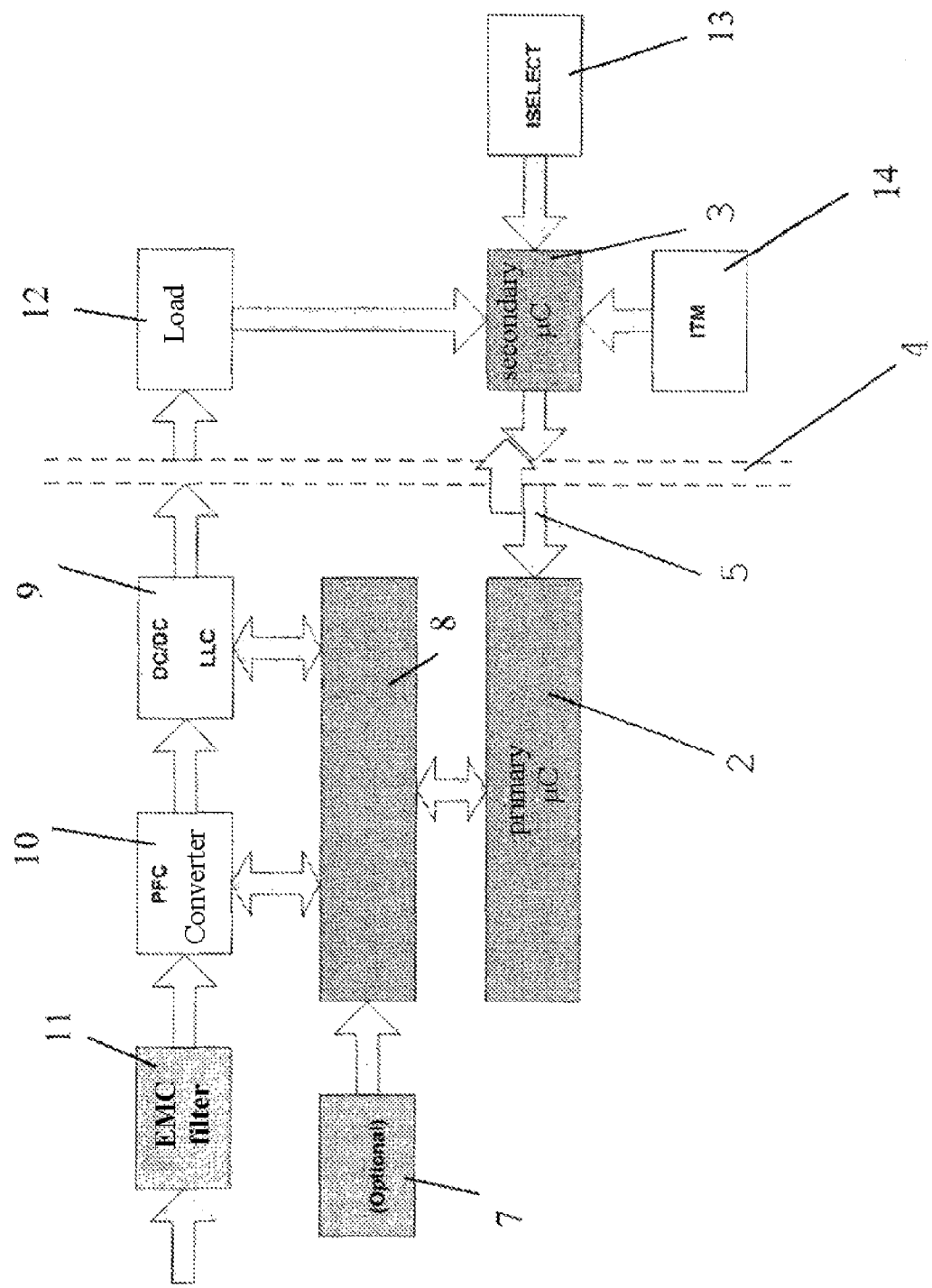
FIG. 2 shows a modular design of an LED converter according to the present invention.

In the example of FIG. 2, the circuit 2 controls a PFC converter 10 for active power factor correction via a control module 8, for example. The PFC converter 10 can be, for example, a boost PFC (boost power-factor correction). The PFC converter 10 can be fed from the input side via the connection for a voltage supply via an EMI filter 11. The EMI filter 11 is used to filter high-frequency interference. The PFC converter 10 can feed a potential-isolated converter 9. The potential-isolated converter 9 is in this case illustrated by way of example as DC-to-DC LLC converter (isolated resonant DC-to-DC voltage converter). The potential-isolated converter 9 preferably has a transformer which bridges the DC isolation 4. One or more LEDs, for example, can be connected as load 12. Optionally, the operating device 1 can also have an actively controlled converter on the secondary-side, which actively controlled converter is controlled by the circuit 3.

The operating device 1 can have an optional interface circuit 7 on the primary side, via which interface circuit brightness commands, for example, can be supplied to the operating device 1. The interface circuit 7 can be connected to the control module 8 or directly to the circuit 2. The control module 8 can have at least one high-voltage driver for driving at least one switching of the PFC converter 10 and/or the potential-isolated converter 9.

The circuit 3 can be used, for example, to detect a current through the load 12. The circuit 3 can also be used to read an item of information 13 (ISELECT) via the load, for example a nominal current, wherein the item of information 13 is predefined by a coding resistor. The circuit 3 can also be used to detect a temperature 14 (ITM) in the operating device 1 and/or at the load 12.

The DC isolation 4 can be bridged, for example, by a transformer. In general, the DC isolation is an SELV barrier or a circuit which enables isolation by means of SELV.

The DC isolation 4 is bridged by a radio channel 5. The radio channel 5 is set up by two radio interfaces 2A and 3A. One radio interface 2A is in this case preferably assigned to the circuit 2 on the primary side; another radio interface 3A is assigned to the circuit 3 on the secondary side. The radio channel 5 connects the at least one primary-side circuit 2 and the at least one secondary-side smart circuit 3 to one another in a unidirectional or bidirectional manner. Preferably, the radio channel 5 permits bidirectional communication between the primary-side and secondary-side circuits 2, 3. The radio channel 5 between the two circuits 2, 3 is preferably an internal communication within the housing 6, as a result of which external interference is avoided.

The radio channel 5 can be created, as shown in FIG. 1, by two antennas 2A and 3A. A first antenna 2A is in this case connected at least to a primary-side circuit 2 and a second antenna 3A is in this case connected at least to a secondary-side circuit 3. Each circuit 2, 3 can be connected to its own antenna 2A, 3A. However, it is also possible for only one antenna 2A to be provided on the primary side and one antenna 3A to be provided on the secondary side for bridging the DC isolation 4.

Each antenna 2A, 3A can be a separate component. However, each antenna 2A, 3A for the radio communication across the DC isolation 4 can also be arranged in a chip housing of the primary-side or secondary-side circuit 2 or 3, or can be formed on a circuit board or printed circuit board of one of the circuits 2, 3. An antenna 2A, 3A can in this case be made at the same time as the integrated circuits of the circuits 2, 3.

The first antenna 2A and the second antenna 3A are preferably arranged such that they are arranged at a position of the respective circuit 2, 3 which is as close as possible to the DC isolation 4. Ideally, the distance to be overcome for the radio path from the first antenna 2A to the second antenna 3A is merely the path which is required for the DC isolation 4 as spatial distance for safety reasons. More preferably, the distance to be overcome is in the range of approximately 0.5 cm to 5 cm, even more preferably approximately 1 cm. Owing to the distance to be overcome and the shielding by the preferably metal housing 6, the radio power for the internal communication between the primary-side circuit 2 and the secondary-side circuit 3 can be set up to be very low. The radio power can in this case preferably be in the range from 1 mW to 100 mW, even more preferably in the range from 1 mW to 10 mW.

Preferably, each antenna 2A, 3A or the radio channel 5 is used not only for the internal communication between the circuits on the primary side and the secondary side, but also as antenna 2A, 3A or radio channel 5 for external communication, for example as a type of wireless DALI bus. Thus, commands can be wirelessly transmitted from the outside to the operating device 1. The commands may be, for example, control commands for the operating device, such as ON/OFF, lighter/darker and the like. The operating device 1 can therefore be externally controlled via radio, in particular via the same radio channel 5 or via the same antenna 2A and/or 3A as is also used for the internal communication between the circuits 2, 3 on the primary side and the secondary side. At least one antenna of the two antennas 2A and 3A can be configured for bidirectional external communication. At least one antenna of the two antennas 2A and 3A can be configured for communication as a DALI interface for a wireless DALI bus. Provision can be made that a radio power for the internal communication and the external communication is different. Thus, for example, a radio power for the external communication can be in the range from 0.1 to 1 watt, preferably up to 100 mW. The operating device 1 can have a control circuit which controls the radio power depending on the communication. The control circuit can have, for example for different data or information which is communicated, different radio powers stored, which it correspondingly selects and adjusts.

The radio channel 5 can be created, for example, by near-field communication, Bluetooth, WPAN or WLAN. Radio communication according to the present invention is clearly distinguishable from purely inductive coupling.

FIG. 2 shows an example of an operating device 1 which is configured to operate illumination means, for instance light-emitting diodes or another load ("load 12"). The load 12 is controlled or at least monitored on the secondary side via a circuit 3, in this example a pC. On the primary side, there is a connection to a voltage supply. This can be achieved, for example, via a filter (EMI filter 11), a power factor correction circuit (PFC converter 10) and a potential-isolated converter 9 and controlled via a primary-side circuit 2. A dimming signal for dimming the illumination means can be supplied to the primary-side circuit 2, for example via the interface circuit 7.

The radio channel 5 overcomes the SELV barrier 4 for communication of the circuits 2 and 3. The item of information 13 or the temperature 14 can be transmitted, for example from the circuit 3, to the circuit 2 via the radio channel 5. Commands or signals, such as brightness commands, can be transmitted, for example from the circuit 2 via the interface circuit 7, to the circuit 3.

In this case, the feature that the illumination means can be supplied on the secondary side with respect to the DC isolation is to be understood as meaning that the illumination means are arranged on the secondary side of the DC isolation and are correspondingly supplied there.

The present invention provides an operating device 1 in which DC isolation 4 between a primary side, which has at least one circuit 2, and a secondary side, which has at least one circuit 3, is bridged by a radio channel 5. As a result of this, radio communication from the primary side to the secondary side and vice versa is possible. An optocoupler or transformer for communicating across the DC isolation 4 (for example SELV barrier) can be omitted. As a result of this, the operating device can be constructed to be less expensive and more compact.

What is claimed is:

1. An operating device (1) for illumination means, the operating device comprises
    a primary-side circuit (2) and a secondary-side circuit (3), which are isolated from one another by DC isolation (4);
    wherein the illumination means can be supplied on the secondary side with reference to the DC isolation and the primary side is set up for connection to a voltage supply, in particular a grid voltage,
    wherein the primary-side circuit (2) and the secondary-side circuit (3) each have a radio interface (21, 22) for setting up a unidirectional or bidirectional radio channel (5) which connects the primary-side circuit (2) and the secondary-side circuit (3) to one another, wherein the radio channel (5) is within a housing (6) of the operating device (1).

2. The operating device (1) as claimed in claim 1, wherein the radio channel (5) is configured for bidirectional communication between the primary-side circuit (2) and the secondary-side circuit (3).

3. The operating device (1) as claimed in claim 1, wherein the radio channel (5) is made up of a first antenna (2A), which is connected to the primary-side circuit (2), and a second antenna (3A), which is connected to the secondary-side smart circuit (3).

4. The operating device (1) as claimed in claim 1, wherein the radio channel (5) is made up of a first antenna (2A), which is formed on a circuit board of the primary-side circuit (2), and a second antenna (3A), which is formed on a circuit board of the secondary-side circuit (3).

5. The operating device (1) as claimed in claim 1, wherein both the radio channel (5) and the two circuits (2, 3) are housed in the housing (6), which is a multi-chip housing.

6. The operating device (1) as claimed in claim 1, wherein the housing (6) is made of metal.

7. The operating device (1) as claimed in claim 1, wherein the radio power of the radio channel (5) is in the range from 1 to 100 mW.

8. The operating device (1) as claimed in claim 1, wherein the radio channel (5) bridges a path of approximately 0.5 to 5 cm between the primary-side circuit (2) and the secondary-side circuit (3).

9. The operating device (1) as claimed in claim 1, wherein the DC isolation (4) is created by means of a transformer.

10. The operating device (1) as claimed in claim 1, wherein the operating device (1) is controllable via the radio channel (5).

11. The operating device (1) as claimed in claim 3, wherein at least one antenna (2A, 3A) is configured for bidirectional external communication.

12. The operating device (1) as claimed in claim 3, wherein at least one antenna (2A, 3A) is configured as a DALI interface.

13. The operating device as claimed in claim 1, wherein the primary-side circuit (2) and/or the secondary-side circuit (3) are/is an application-specific integrated circuit (ASIC).

14. The operating device (1) as claimed in claim 1, wherein the primary-side circuit (2) and/or the secondary-side circuit (3) control(s) a clocked component and/or a component with a power-controlling element.

15. The operating device (1) as claimed in claim 1, wherein the operating device (1) is an LED converter.

16. An LED luminaire having an LED string which is supplied from the secondary side of an operating device (1) as claimed in claim 1.

17. A method for operating (1) illumination means, the method comprises:
    providing an electric supply for the illumination means by means of a primary-side circuit (2) and a secondary-side circuit (3), which are isolated from one another by means of DC isolation (4);
    wherein the illumination means can be supplied on the secondary side with reference to the DC isolation and the primary side is set up for connection to a voltage supply, in particular a grid voltage,
    wherein the primary-side circuit (2) and the secondary-side circuit (3) communicate with one another via a unidirectional or bidirectional radio channel (5).

* * * * *